(12) United States Patent
Lin

(10) Patent No.: US 8,789,823 B2
(45) Date of Patent: Jul. 29, 2014

(54) FIXING APPARATUS AND MEASURING METHOD FOR OPTICAL FIBER HOLE INSERT

(75) Inventor: I-Thun Lin, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 818 days.

(21) Appl. No.: 12/915,012

(22) Filed: Oct. 29, 2010

(65) Prior Publication Data
US 2011/0280534 A1    Nov. 17, 2011

(30) Foreign Application Priority Data
May 11, 2010    (TW) .............................. 99114921 A

(51) Int. Cl.
*B25B 11/00* (2006.01)
*G02B 6/38* (2006.01)
*G02B 6/36* (2006.01)

(52) U.S. Cl.
CPC .............. *G02B 6/385* (2013.01); *G02B 6/3865* (2013.01); *G02B 6/3636* (2013.01); *G02B 6/3616* (2013.01); *Y10S 269/903* (2013.01)
USPC .............................. 269/50; 269/274; 269/903

(58) Field of Classification Search
USPC ................... 269/903, 274, 239, 37 M, 268, 50
See application file for complete search history.

(56) References Cited

U.S. PATENT DOCUMENTS

| 5,274,723 A | 12/1993 | Komatsu |
| 6,215,942 B1 * | 4/2001 | DeMeritt et al. ............... 385/136 |
| 7,316,390 B2 * | 1/2008 | Burlison ....................... 269/274 |
| 7,908,725 B1 * | 3/2011 | Irish et al. ....................... 29/271 |
| 8,096,538 B2 * | 1/2012 | Herbold et al. ................. 269/37 |
| 8,387,222 B2 * | 3/2013 | Chen et al. .................... 29/281.1 |
| 2011/0280534 A1 * | 11/2011 | Lin .............................. 385/134 |

FOREIGN PATENT DOCUMENTS

| CN | 1333881 A | 1/2002 |
| CN | 1333883 A | 1/2002 |
| CN | 101612697 A | 12/2009 |
| TW | M379481 U1 | 5/2010 |

* cited by examiner

*Primary Examiner* — Lee D Wilson
(74) *Attorney, Agent, or Firm* — Novak Druce Connolly Bove + Quigg LLP

(57) ABSTRACT

An apparatus for fixing an optical fiber hole insert in coordinate measurement, is provided. The apparatus includes a main body and a cover plate. The main body includes a front side surface, a back side surface and a support surface, a plurality of first grooves formed in the support surface and exposed at the front side surface, a plurality of second grooves formed in the support surface and exposed at the back side surface, and a through hole defined in the support surface. The first grooves is aligned with the respective second grooves, the first and second grooves communicate with the through hole and are configured for cooperatively receiving the optical fiber hole insert. The cover plate is configured for covering the support surface and coming into contact with the optical fiber hole insert. A method for measuring the optical fiber hole insert using the apparatus is also provided.

17 Claims, 6 Drawing Sheets

FIXING APPARATUS AND MEASURING METHOD FOR OPTICAL FIBER HOLE INSERT

BACKGROUND

1. Technical Field

The present disclosure relates to an apparatus for fixing an optical fiber hole insert, and a method for measuring the optical fiber hole insert.

2. Description of Related Art

Optical fiber connectors are widely used in optical fiber communications. Precision of the optical fiber connector, especially the optical fiber hole of the optical fiber connector is critical for reducing light loss of the optical fiber communication. The precision of the optical fiber hole is usually determined by an optical fiber hole insert of a mold, which is used to form the optical fiber hole, as such the insert needs to be carefully measured, including the size and the coarseness thereof.

Coordinate measurement instruments may include probe contact coordinate measurement instruments and optical non-contact coordinate measurement instruments, which are capable of performing coordinate measurements (usually three-dimensional measurements) of objects. Fixing apparatuses which are key components of the coordinate measurement instruments, are used to fix the objects in position.

As shown in FIG. 6, a cylindrical shaped insert 30 for insert molding the optical fiber hole. Along the lengthwise direction of the insert 30 are the distal end 31 and the optical fiber hole mold portion 32 in a three-step manner. Diameters of the insert 30 gradually decrease from the distal end 31 to the end of the optical fiber hole mold portion 32. A length of the distal end 31, length and diameter of each step of the optical fiber hole mold portion 32 need to be measured. However, as the entire insert 30 is cylindrical shaped, it is difficult to position the insert 30. In addition, it is difficult to find a reference surface on the insert 30 for the coordinate measurements.

What is needed, therefore, are an apparatus for fixing an optical fiber hole insert in a coordinate measurement and a method for measuring the optical fiber hole insert, which can overcome the above shortcomings.

BRIEF DESCRIPTION OF THE DRAWINGS

Many aspects of the present apparatus and method can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

DETAILED DESCRIPTION

Embodiments of the present apparatus and method will now be described in detail below and with reference to the drawings.

Figure 1:
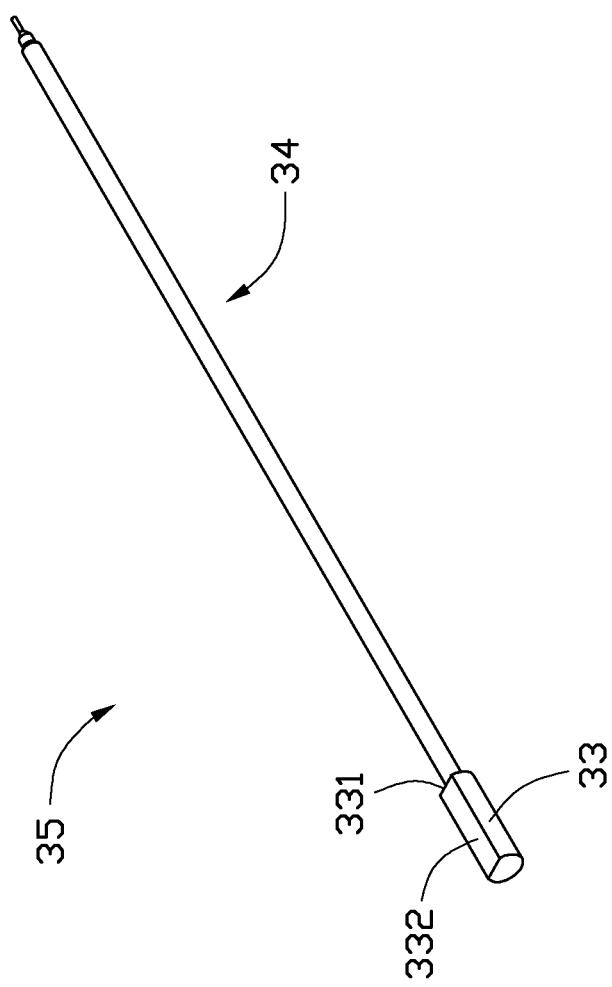
FIG. 1 shows a machined insert to be used in a coordinate measurement in accordance with an embodiment, the machined insert can be obtained by machining a conventional optical fiber hole insert.
Figure 2:
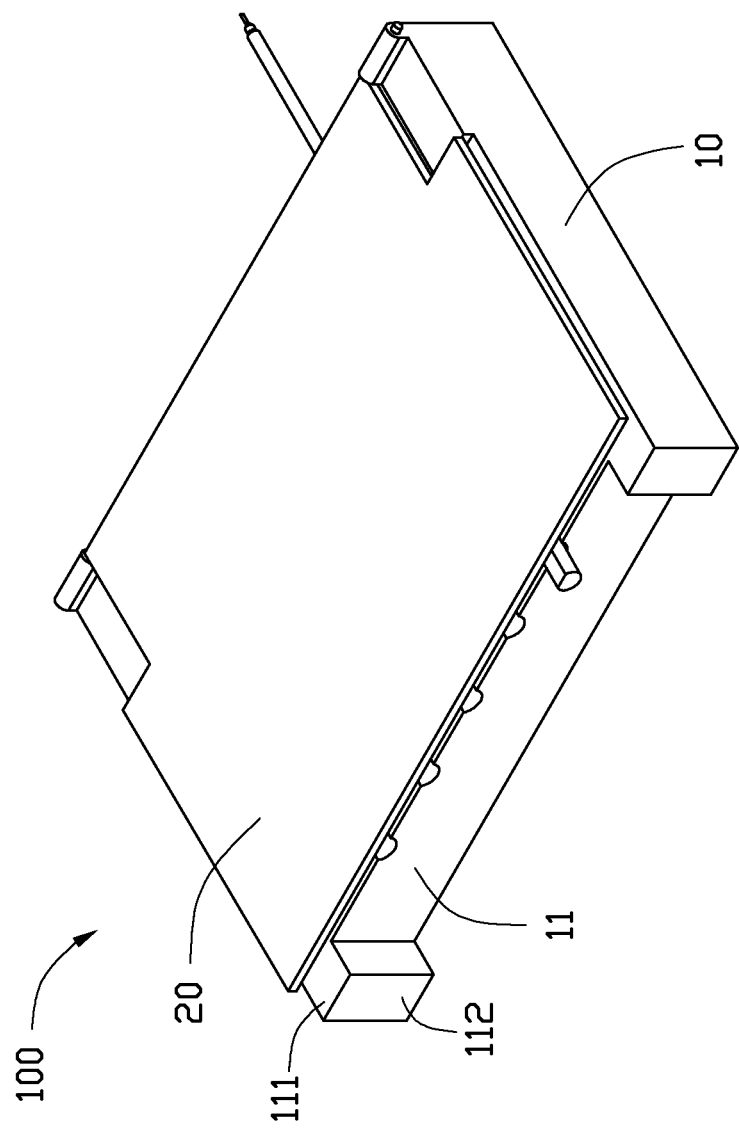
FIG. 2 shows an apparatus for optical fiber hole insert coordinate measurement in accordance with an embodiment, the apparatus fixing the machined insert therein.
Figure 3:
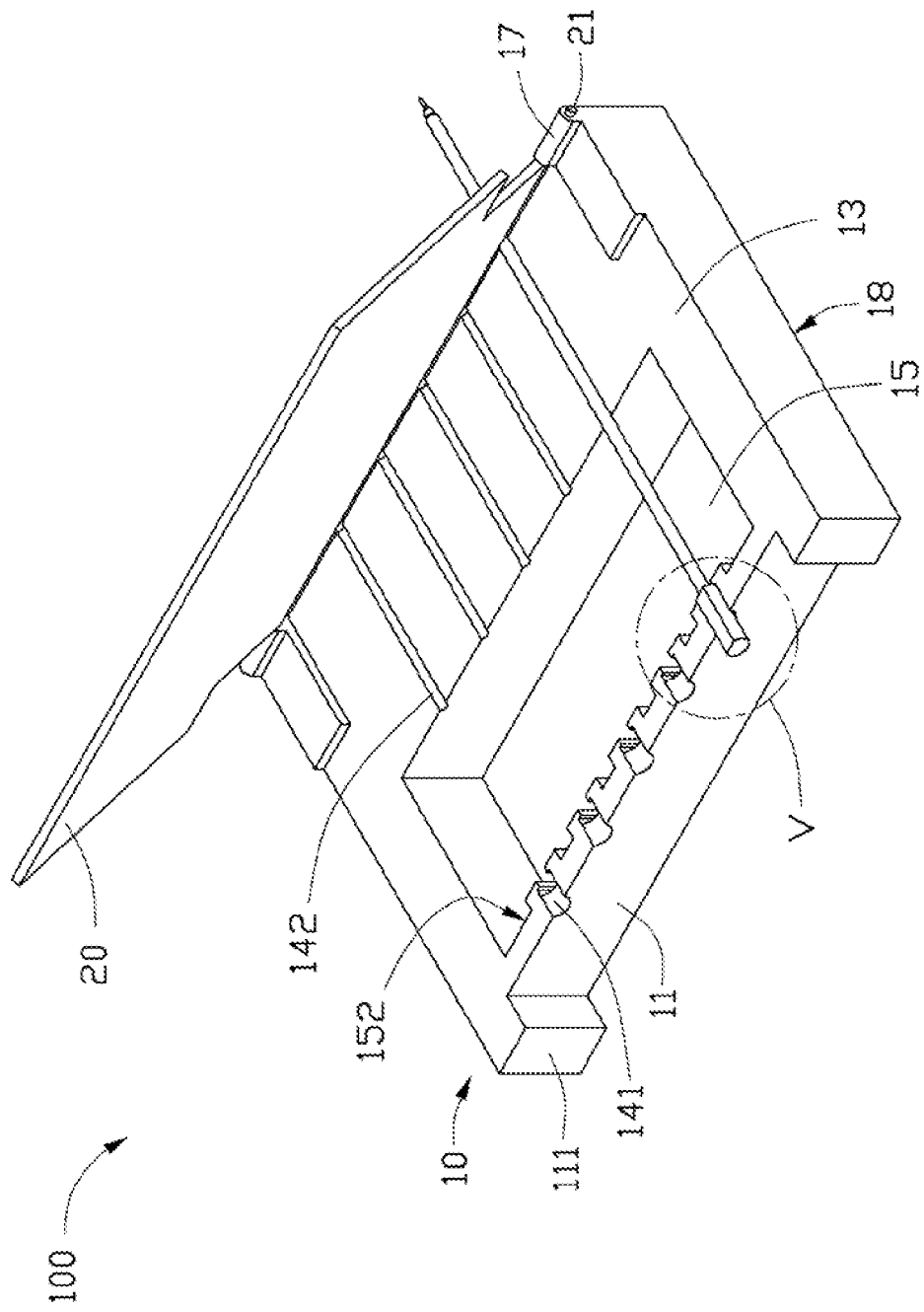
FIG. 3 is a second view of the apparatus of FIG. 2, wherein a cover plate of the apparatus is open.
Figure 4:
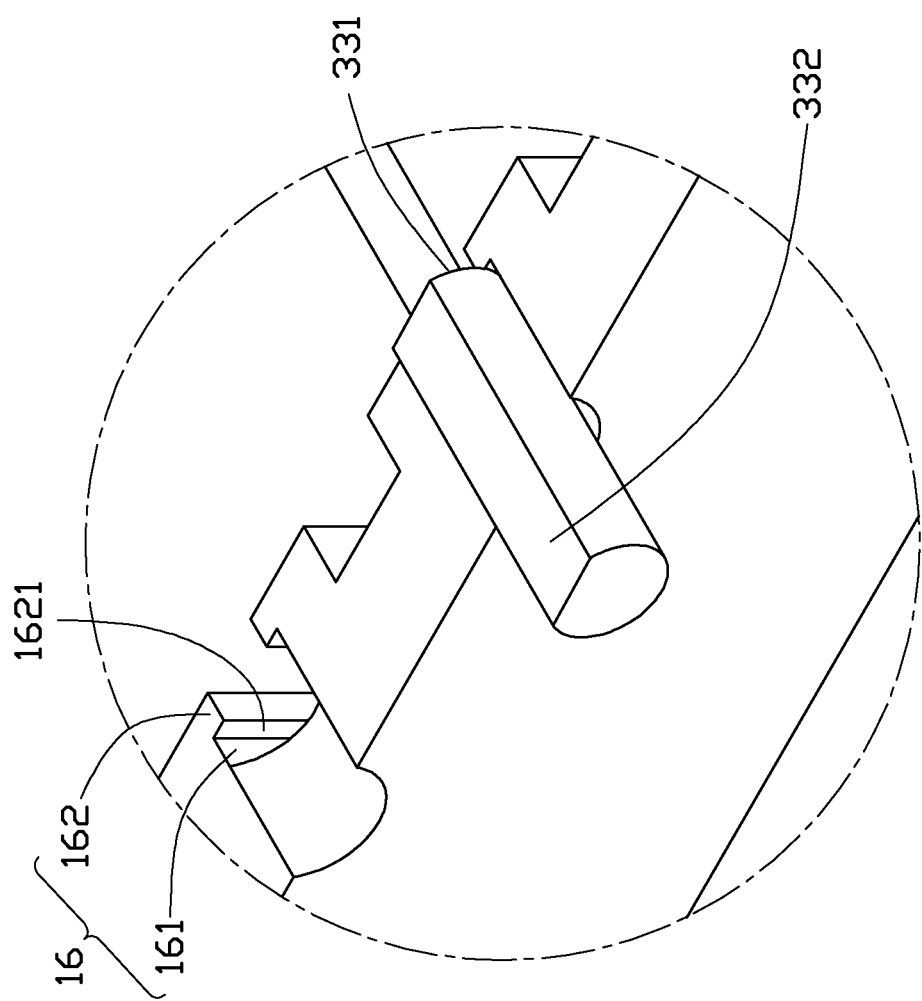
FIG. 4 is an enlarged view of the V portion of the apparatus of FIG. 3.
Figure 5:
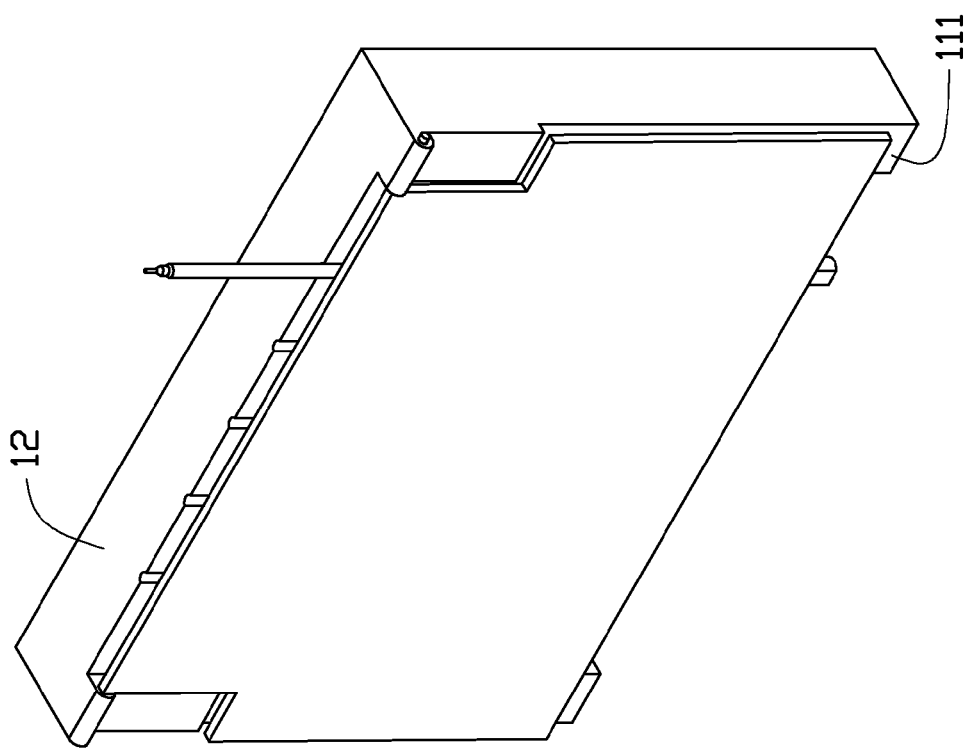
FIG. 5 is a third view of the apparatus of FIG. 2, wherein the apparatus stands up in a 90 degree-manner.
Figure 6:
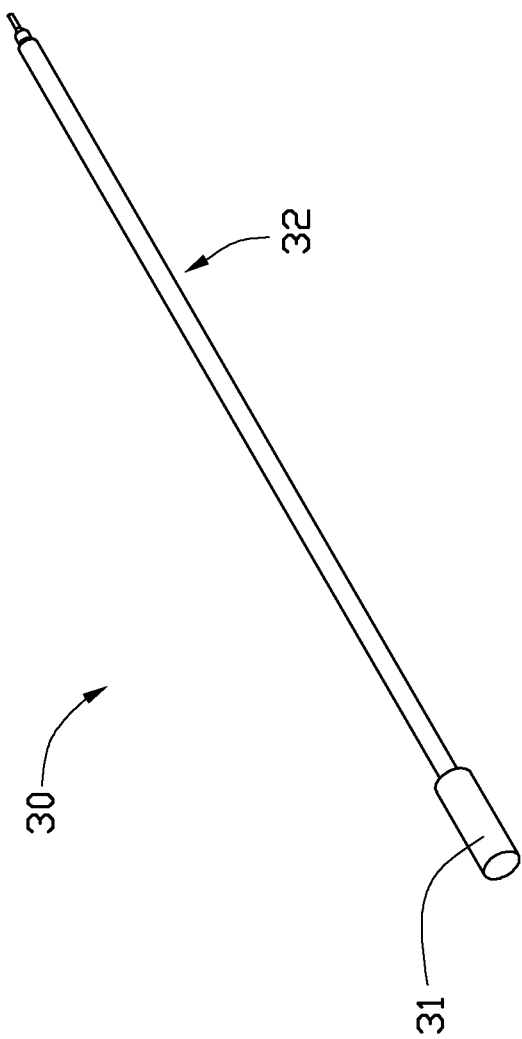
FIG. 6 is a schematic view of a conventional optical fiber hole insert for insert molding an optical fiber hole of an optical fiber connector.

Referring to FIGS. 1 to 5, an apparatus 100 for fixing an optical fiber hole insert in a coordinate measurement, is provided. The apparatus 100 includes a main body 10 and a cover plate 20 pivotably mounted to the main body 10 by a pivot 21. A machined insert 35 is used in the coordinate measurement, and the machined insert 35 can be obtained by machining an insert 30 illustrated above.

Referring again to FIG. 1, the machined insert 35 also has a distal end 33 and three-step shaped optical fiber hole mold portion 34. The diameter of the machined insert 35 gradually decreases from the distal end 33 to the end of the optical fiber hole mold portion 34. A vertical surface 331 interconnects the distal end 33 and the optical fiber hole mold portion 34. The distal end 33 has a flat surface 332 formed thereon, the flat surface 332 is parallel with a central axis of the machined insert 35. The flat surface 332 can serve as a reference plane in the coordinate measurement. As the distal end 33 mainly serves as a support for the optical fiber hole mold portion 34, therefore, the flat surface 332 would not influence the optical fiber hole molding.

Referring again to FIGS. 2 to 5, the main body 10 is substantially rectangular shaped, and includes a top surface 13, a bottom surface 18, a front side surface 11, and a back side surface 12. The top surface 13 and the bottom surface 18 are positioned at opposite sides of the main body 10, and the front side surface 11 and the back side surface 12 are positioned at opposite sides of the main body 10. The top surface 13 and the bottom surface 18 are interconnected between the front side surface 11 and the back side surface 12. Two protrusions 111 are formed on the front side surface 11. Each of the protrusions 111 is smoothly connected to a lateral side surface of the main body 10, and has a flat end surface 112. The entire apparatus 100 can rely upon the flat end surfaces 112 to stand up (see FIG. 5).

The top surface 13 serves as a support surface. Two pivot retaining members 17 are formed on the top surface 13, for retaining the pivot 21. The top surface 13 defines a number of first grooves 141 and corresponding second grooves 142 therein. Each of the first and second grooves 141, 142 has a semi-circular shape. The first grooves 141 are exposed at the front side surface 11, and the second grooves 142 are exposed at the back side surface 12. A through hole 15 is formed in the main body 10 between the top surface 13 and the bottom surface 18. The first and second grooves 141, 142 communicate with the through hole 15. In particular, the first grooves 141, the through hole 15 and the respective second grooves 142 are arranged in that order from the front side surface 11 to the back side surface 12. The first groove 141 retains the distal end 33 of the machined insert 35, and the second groove 142 retains the optical fiber hole mold portion 34 of the machined insert 35.

Referring again to FIGS. 3 and 4, the main body 10 further includes an inner side surface 152 in the through hole 15. The inner side surface 152 and the front side surface 11 are located at opposite ends of each of the first grooves 141, and the first grooves 141 are exposed at the inner side surface 152. A number of pairs of protrusions 16 extend from the inner side surface 152, and each pair of the protrusions 16 are arranged opposite to each other on the two sides of the first groove 141. Each of the protrusions 16 is substantially L shaped, and includes a first portion 161 extending from the inner side surface 152, and a second portion 162 extending from the first portion 161. The two second portions 162 of each pair of the protrusions 16 extend toward each other and have coplanar retaining surfaces 1621 facing toward the first grooves 141 for engaging with the machined insert 35.

In application, the machined insert 35 is placed in the main body 10, with the vertical surface 331 of the machined insert 35 retained on the retaining surface 1621 of the protrusions 16, and the flat surface 332 of the distal end 33 opposing the cover plate 20. As the first grooves 141 and the second grooves 142 are semi-circular, diameters of the distal end 33 and optical fiber hole mold portion 34 can be the same as, or a little greater or a little less than those of the first and second grooves 141 and 142 with the help of the closed cover plate 20. The flat surface 332 allows a better contact with the cover plate 20, thus the machined insert 35 is well positioned. A distance between the front and back side surfaces 11, 12 is less than that of the machined insert 35, thus a part of the distal end 33 and a part of the optical fiber hole molding portion 34 locate outside the cover plate 20.

Coordinate measurements of coarseness and size of the distal end 33 and the optical fiber hole mold portion 34 can be carried out from the front side, the back side and the through hole 15 of the main body 10. Probe contact coordinate measurement or optical non-contact coordinate measurement can be used in the coordinate measurements.

Because of the flat surface 332, an X, Y Z coordinate system can be defined thereon, including the vertical surface 331 perpendicular thereto. In addition, in some situations, the cover plate 20 can be transparent to see the coordinate measurements.

A method for optical fiber hole insert coordinate measurement is also provided, and the method may include the steps as follows. First, provide the apparatus 100 illustrated above. Second, machine a distal end of an optical fiber hole insert to be measured to form a flat surface 332 on the distal end, wherein the flat surface 332 is parallel with a central axis of the insert. Third, position the machined insert in the apparatus 100 and allow the cover plate 20 to get in contact with the flat surface 332 of the machined insert. Fourth, perform coarseness and size coordinate measurement for the machined insert.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for fixing an optical fiber hole insert, the optical fiber hole insert configured for forming a hole in an optical connector for receiving an optical fiber, the apparatus comprising:

a main body comprising a front side surface, a back side surface and a support surface, the front side surface and the back side surface located at opposite sides of the main body, the support surface interconnected between the front side surface and the back side surface, a plurality of first grooves formed in the support surface and exposed at the front side surface, a plurality of second grooves formed in the support surface and exposed at the back side surface, and a through hole defined in the support surface between the plurality of first grooves and the plurality of second grooves, the first grooves aligned with the respective second grooves, the first and second grooves communicating with the through hole and configured for cooperatively receiving the optical fiber hole insert; and a cover plate configured for covering, the support surface and coming into contact with the optical fiber hole insert, thereby fixing the optical fiber hole insert in the first and second grooves.

2. The apparatus of claim 1, wherein the main body further comprises an inner side surface in the through hole, the first grooves are exposed at the inner side surface, a plurality of pairs of protrusions extend from the inner side surface, each of the protrusions comprises as first portion extending from the inner side surface and a second portion extending away from the first portion, and the two second portions of each pair of the protrusions extend toward each other and have coplanar retaining surfaces facing toward the first grooves for engaging with the optical fiber hole insert.

3. The apparatus of claim 2, wherein each of the protrusions is substantially L-shaped.

4. The apparatus of claim 3, wherein two retaining members are formed on the top surface, a pivot is retained by the two retaining members, and the cover plate is pivotably mounted on the top surface by the pivot.

5. The apparatus of claim 1, wherein each of the first grooves and second grooves is in a semi-circular shape.

6. The apparatus of claim 1, wherein the cover plate is pivotably mounted to the main body.

7. The apparatus of claim 6, wherein the cover plate is transparent.

8. The apparatus of claim 1, wherein two spaced protrusions are formed on the front side surface, and each of the protrusions comprises a flat end surface facing away from the front side surface.

9. The apparatus of claim 1, wherein the plurality of first grooves, the through hole, and the plurality of second grooves are arranged in that order from the front side surface to the back side surface.

10. An apparatus for fixing an optical fiber hole insert, the optical fiber hole insert comprising an optical fiber hole molding portion and a distal end extending from the optical fiber hole molding portion, the apparatus comprising:

a main body comprising a front side surface, a back side surface and a support surface, the front side surface and the hack side surface located at opposite sides of the main body, the support surface interconnected between the front side surface and the back side surface, a plurality of first grooves formed in the support surface and exposed at the front side surface, a plurality of second grooves formed in the support surface and exposed at the back side surface, and a through hole defined in the support surface between the plurality of first grooves and the plurality of second grooves, the first grooves aligned with the respective second grooves, the first and second grooves communicating with the through hole, each of the first grooves configured for receiving the distal end of the optical fiber hole insert, each of the second grooves configured for receiving the optical fiber hole molding portion; and a cover plate configured for covering the support surface and coming into contact with the optical fiber hole insert, thereby fixing the optical fiber hole insert in the first and second grooves.

11. The apparatus of claim 10, wherein the main body further comprises an inner side surface in the through hole, the first grooves are exposed at the inner side surface, a plurality of pairs of protrusions extend from the inner side surface, each of the protrusions comprises a first portion extending from the inner side surface and a second portion extending away from the first portion, and the two second portions of each pair of the protrusions extend toward each other and have coplanar retaining surfaces facing toward the first grooves for engaging with the distal end of the optical fiber hole insert.

12. The apparatus of claim 11, wherein each of the protrusions is substantially L-shaped.

13. The apparatus of claim 11, wherein two retaining members are formed on the top surface, a pivot is retained by the two retaining members, and the cover plate is pivotably mounted on the top surface by the pivot.

14. The apparatus of claim 11, wherein each of the first grooves and second grooves is in a semi-circular shape.

15. The apparatus of claim 11, wherein the cover plate is transparent.

16. The apparatus of claim 10, wherein the plurality of first grooves, the through hole, and the plurality of second grooves are arranged in that order from the front side surface to the back side surface.

17. The apparatus of claim 10, wherein two spaced protrusions are formed on the front side surface, and each of the protrusions comprises a flat end surface facing away from the front side surface.

* * * * *